US012115725B2

(12) United States Patent
Wang et al.

(10) Patent No.: US 12,115,725 B2
(45) Date of Patent: Oct. 15, 2024

(54) SLURRY-BASED STEREOLITHOGRAPHIC APPARATUS

(71) Applicant: National Taipei University of Technology, Taipei (TW)

(72) Inventors: Jia-Chang Wang, Taipei (TW); Shin-Hua You, Changhua County (TW)

(73) Assignee: 3DCELAIN LTD., New Taipei (TW)

( * ) Notice: Subject to any disclaimer, the term of this patent is extended or adjusted under 35 U.S.C. 154(b) by 25 days.

(21) Appl. No.: 18/074,557

(22) Filed: Dec. 5, 2022

(65) Prior Publication Data
US 2023/0173752 A1    Jun. 8, 2023

Related U.S. Application Data

(60) Provisional application No. 63/286,144, filed on Dec. 6, 2021.

(51) Int. Cl.
*B29C 64/214*    (2017.01)
*B29C 64/106*    (2017.01)
(Continued)

(52) U.S. Cl.
CPC .......... *B29C 64/214* (2017.08); *B29C 64/106* (2017.08); *B29C 64/245* (2017.08);
(Continued)

(58) Field of Classification Search
CPC ... B29C 64/214; B29C 64/321; B29C 64/245; B29C 64/218; B29C 64/241; B33Y 30/00
See application file for complete search history.

(56) References Cited

U.S. PATENT DOCUMENTS

2017/0355100 A1\* 12/2017 Pateloup ................. B28B 1/001
2018/0141267 A1\* 5/2018 Dudley ................. B29C 64/106
(Continued)

FOREIGN PATENT DOCUMENTS

CN         213226728 U     5/2021
DE    10 2005 035 987 A1   2/2007
(Continued)

OTHER PUBLICATIONS

European Search Report for European Application No. 22211072.8, dated Mar. 13, 2023.

*Primary Examiner* — Alison L Hindenlang
*Assistant Examiner* — Keran V Nguyen
(74) *Attorney, Agent, or Firm* — Birch, Stewart, Kolasch & Birch, LLP

(57) ABSTRACT

A stereolithographic apparatus has a machine body disposed with a swept platform, which has a recess formed by recessing into a circumference of the swept platform. A build platform driven by the linear actuator to move is aligned with and abuts against a recess. A motor and a light-emitting device are disposed in the machine body. The motor drives a recoating blade to sweep on the swept platform and the build platform. By rotating the recoating blade, the slurry material could circularly spread the slurry material onto the build platform to form multiple build layers. After each build layer is spread, the light-emitting device irradiates the build layer to partially cure the build layer to form a build layer. By repeating the aforementioned process, the build layers are formed to pile as a printed product (e.g. green body), thereby rapidly producing a delicate product without supporting structure.

11 Claims, 13 Drawing Sheets

(51) Int. Cl.
  *B29C 64/245* (2017.01)
  *B29C 64/321* (2017.01)
  *B33Y 30/00* (2015.01)
  *B33Y 40/10* (2020.01)

(52) U.S. Cl.
  CPC ............ *B29C 64/321* (2017.08); *B33Y 30/00* (2014.12); *B33Y 40/10* (2020.01)

(56) References Cited

U.S. PATENT DOCUMENTS

| | | | |
|---|---|---|---|
| 2019/0329497 A1* | 10/2019 | Deak | B29C 64/393 |
| 2020/0346407 A1* | 11/2020 | Goodwin | B29C 54/268 |
| 2020/0376752 A1* | 12/2020 | Cilia | B33Y 40/00 |
| 2021/0101209 A1* | 4/2021 | Brandenburg | B22F 3/1266 |
| 2021/0162657 A1 | 6/2021 | Chartrain et al. | |

FOREIGN PATENT DOCUMENTS

| | | |
|---|---|---|
| EP | 1 270 185 A1 | 1/2003 |
| EP | 2 724 844 A1 | 4/2014 |

* cited by examiner

SLURRY-BASED STEREOLITHOGRAPHIC APPARATUS

CROSS REFERENCE TO RELATED APPLICATIONS

This non-provisional application claims the benefit under 35 U.S.C. § 119 (e) to U.S. Provisional Application No. 63/286,144, filed on Dec. 6, 2021, which is hereby expressly incorporated by reference into the present application.

BACKGROUND OF THE INVENTION

Technical Field

The present invention relates generally to a 3D printing apparatus, and more particularly to a slurry-based stereolithographic apparatus.

Description of Related Art

So far, a conventional light-cured 3D printing apparatus for printing ceramic, metal, or composite material has a material tank, wherein the material tank is filled with a prepared slurry, and light is emitted to irradiate a portion of a surface of the slurry material in the material tank to form one build layer on a build platform. By simply lifting up or descending down the build platform in the material tank, a plurality of build layers could be built to form a printed product layer by layer. The slurry in the material tank includes ceramic, metallic, or composite powder in liquid resin.

Although the conventional light-cured 3D printing apparatus can be used to print the ceramic product by using a ceramic slurry material, there are some difficult issues that need to be solved. For example, during the printing process, except for the main body of the printed product, other supporting structures have to be printed to support the main body of the printed product, which will need a very experienced design and carefully remove the supporting structure after print. Besides, since the recoating blade is for sweeping the high viscosity ceramic slurry material forward and backward, the layer thickness can not be very thin and the recoating speed has to be very slow, which the printing time will be prolonged and also limit the detail of the printout.

BRIEF SUMMARY OF THE INVENTION

In view of the above, the primary objective of the present invention is to provide a slurry-based stereolithographic apparatus, wherein a recoating blade is rotated 360 degrees to circularly form a layer of stereolithographic slurry material on a build plate. The special slurry can have low viscosity during paving and high viscosity once has been paved on the build area (setting) to form a build layer. The special slurry can achieve this phenomenon by either adding a volatile solvent or a temperature difference during paving and setting. Because of the low viscosity of the slurry during paving, a very thin layer thickness of the slurry can be coated and in a related higher recoating speed. After paving, the coated slurry will either dry out or cold down to have a relatively higher viscosity as the build layer which will be able to give support to the printing part. On the other hand, the printing time will be reduced and there is no need for building supporting structures. As a result, better details of the printout in less time can be achieved.

The present inventive subject matter provides a slurry-based stereolithographic apparatus that includes a machine body, a recoating device, a lifting apparatus, a light-emitting device, and a slurry material feeding device. The machine body has a swept platform, wherein a top surface of the swept platform has a swept surface and a recess that is formed by recessing into a circumference of the swept platform. The recess has an opening on the circumference of the swept platform. The recoating device has a motor that is disposed in the machine body, wherein the motor is connected to a shaft, and the shaft is engaged with a blade holder. A recoating blade is disposed on the blade holder and has a cutting edge that is adjacent to or abuts against the swept surface. An area that is swept by the cutting edge is defined to be a swept area, wherein at least a portion of the recess is located in the swept area. The lifting apparatus has a build platform that is located in the recess, wherein an edge of the build platform is aligned with and abuts against an edge of the recess. The build platform is driven by a linear actuator to move linearly, and the linear actuator is disposed in the machine body. The light-emitting device is disposed in the machine body and has a lens, wherein the lens faces in a direction toward the build platform. The slurry material feeding device has an outlet, wherein the outlet faces toward the swept area.

When the slurry-based stereolithographic apparatus provided in the present invention is operated, the motor drives the recoating blade to start to rotate in a direction constantly from an initial position. After the recoating blade starts to rotate, the slurry material feeding device outputs the slurry material through the outlet to the swept surface, so that the recoating blade could spread the slurry material, which is outputted through the outlet and is remained on the swept surface i.e. on the top surface of the build platform.

After the slurry material is spread by the recoating blade, the slurry material forms a build layer on the build platform. Then, the build platform is moved down a distance that is approximately equal to a thickness of the build layer, and the light-emitting device irradiates the build layer to selectively cure the build layer, a cured portion of the build layer forms a cured area. By repeating the aforementioned processes, including providing slurry material by the slurry material feeding device, spreading the slurry material by the recoating blade, descending the build platform, and irradiating the build layer by the light-emitting device, a plurality of build layers are formed on the build platform, wherein the plurality of build layers are piled to form a build block, wherein the cured area of each of the build layers are piled to form a printed product, such as a ceramic green body which is not sintered. After the ceramic green body is cleaned, the ceramic green body could be sent to a sintering furnace to be sintered.

With such design, the recoating blade spread the slurry on the top of the surface by rotating in one direction constantly. Comparing with the conventional recoating blade that is moved linearly back and forth, the rotating motion of the recoating blade of the present invention does not need the returning trip in an opposite direction. Therefore, the recoating blade could save the time cost by the returning trip of the linearly-moved recoating blade and prevent the remaining material on the recoating blade from falling onto the build platform during the returning trip. Additionally, the excess slurry material is remained on the pathway of the recoating blade, so that the remained slurry material could be utilized again in the next build layer. When the remained slurry material could be effectively reused during the process, the cost of manufacture could be significantly reduced.

The slurry could include volatile solvent so that the slurry stored in the feeding device outputted from the feeding device could have a low viscosity, which facilitates spreading. Every time, after the slurry stored in the feeding device is spread on the build platform to form the build layer, the solvent volatilizes to increase the viscosity of the build layer. Due to a viscosity difference between the slurry stored in the feeding device and the build layer, the previous layer has related high viscosity like gel to be semisolid and will not be broken or moved by the shearing force generated during the next slurry recoating process. Besides, since a solvent in the build layer is volatilized to make the build layer semisolid, the build layer could naturally provide support to the printed product that is piled by the plurality of cured area, thereby avoiding to design and print the supporting structures. Additionally, after volatilization layer by layer, the solid loading (volume ratio between powder and liquid) of the setting slurry is increased, and so is the printed product, i.e. green part. This high solid loading green part can be sintered according to the thermal debinding and sintering profile to achieve a near fully dense part.

The slurry material could have different viscosity under different temperatures. Therefore, the slurry material feeding device could heat the slurry material that is outputted to have lower viscosity, which facilitates spreading. Every time, the slurry material is spread on the build platform, the slurry material is cooled down to increase the viscosity of the build layer. The slurry material could also act like Bingham plastic which behaves as a rigid body at low stresses but flows as a viscous fluid at high stress. Due to a viscosity difference between the slurry material and the build layer, the previous layer has related high viscosity like gel to be semisolid and will not be broken or moved by the shearing force generated during the next slurry recoating process. Besides, since the build layer is semisolid, the build layer could naturally provide support to the printed product, thereby there is no need to design and print the supporting structures. If the solid loading is high enough for the green part, it can be sintered according to the thermal debinding and sintering profile to achieve a near-fully dense part.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
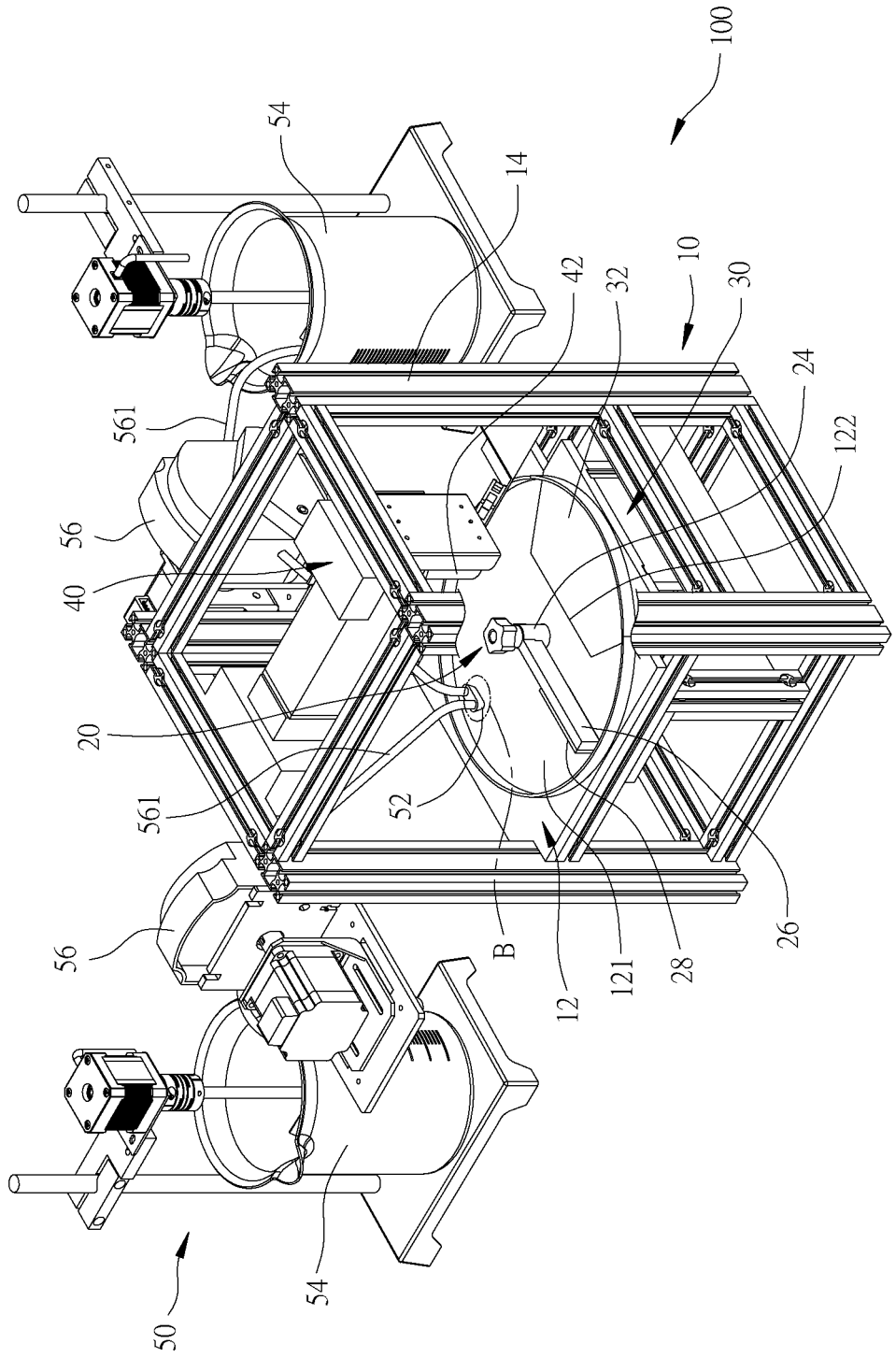
FIG. 1 is a perspective view of the stereolithographic apparatus of an embodiment according to the present invention.
Figure 2:
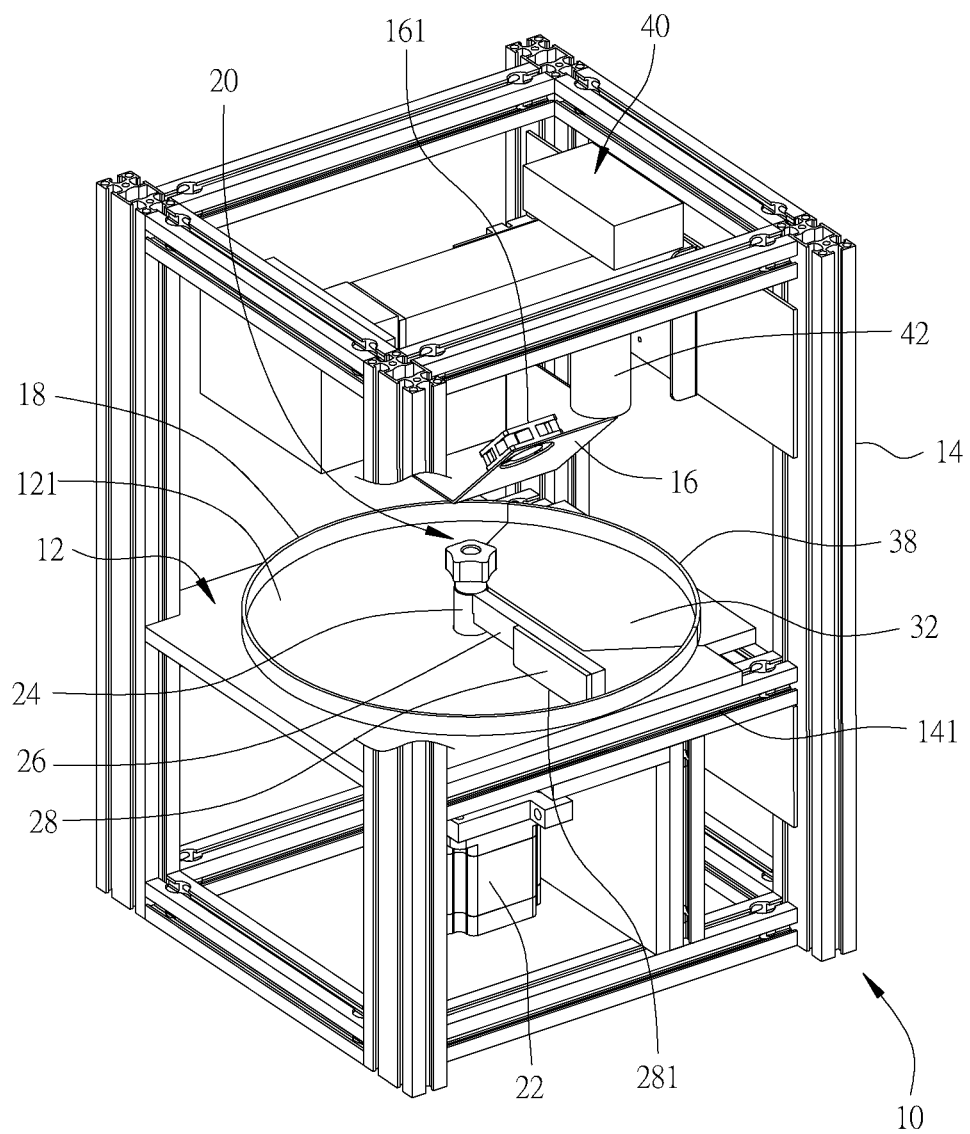
FIG. 2 is a perspective view of the machine body of the stereolithographic apparatus shown in FIG. 1.
Figure 3:
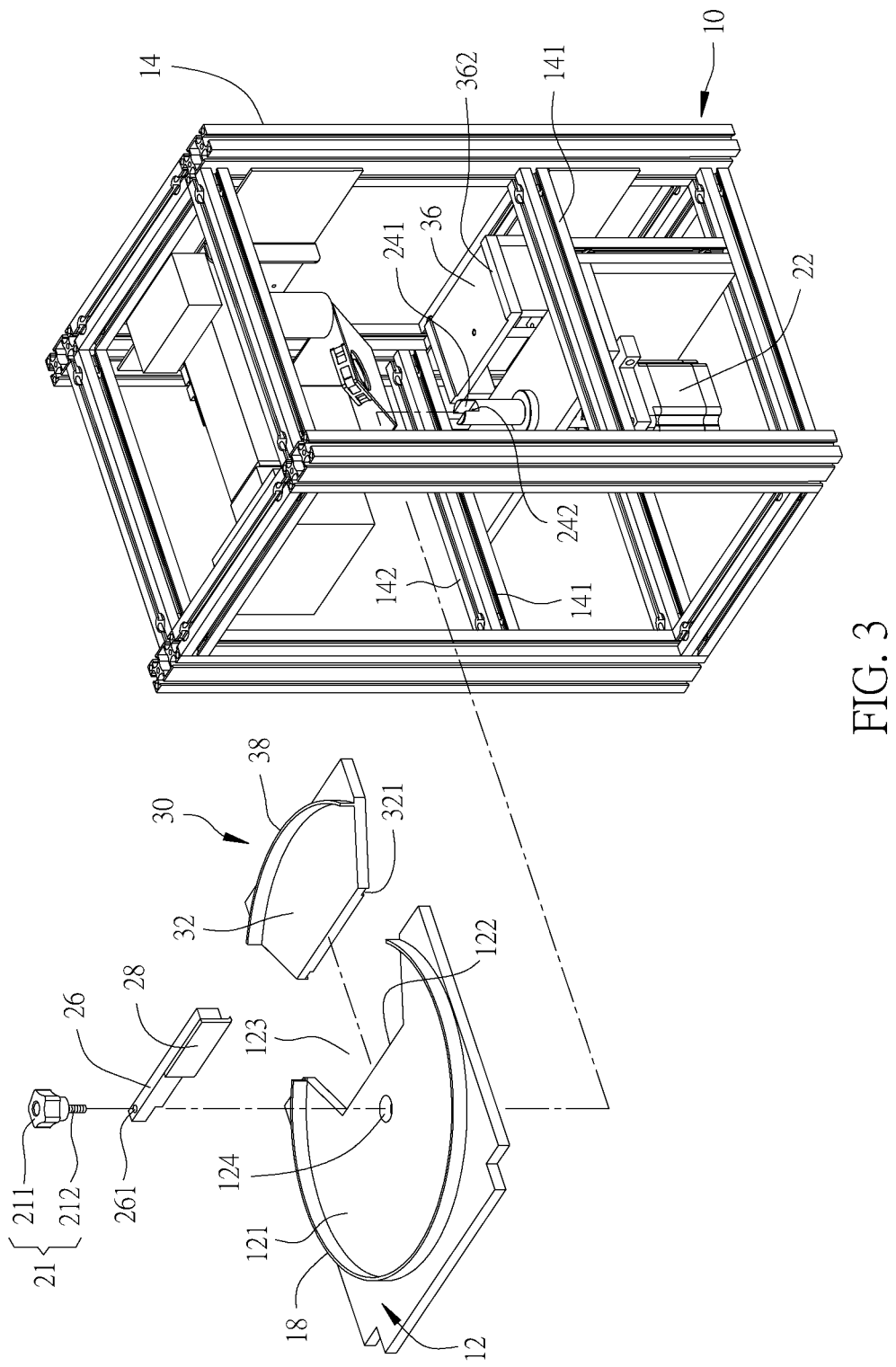
FIG. 3 is a partially exploded view of the machine body of the stereolithographic apparatus shown in FIG. 1.
Figure 4:
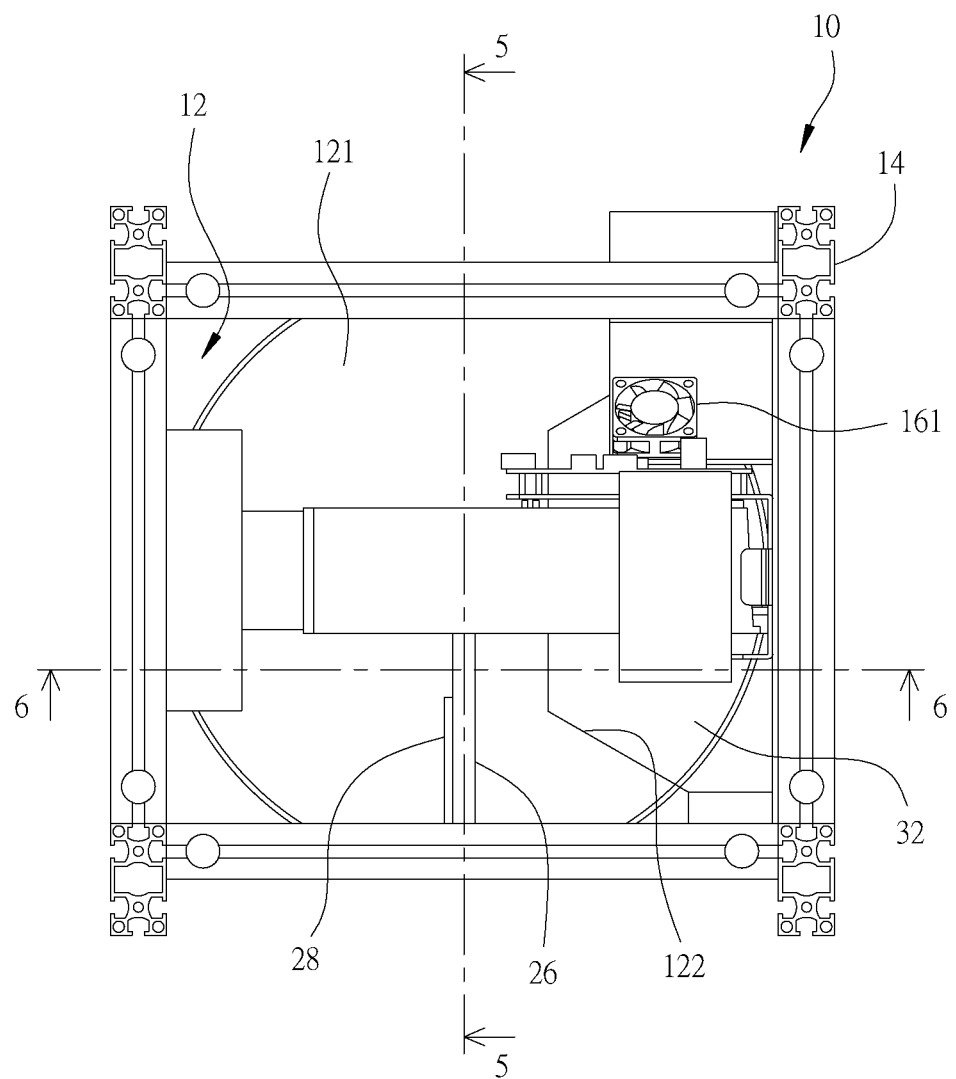
FIG. 4 is a top view of the machine body of the stereolithographic apparatus shown in FIG. 1.
Figure 5:
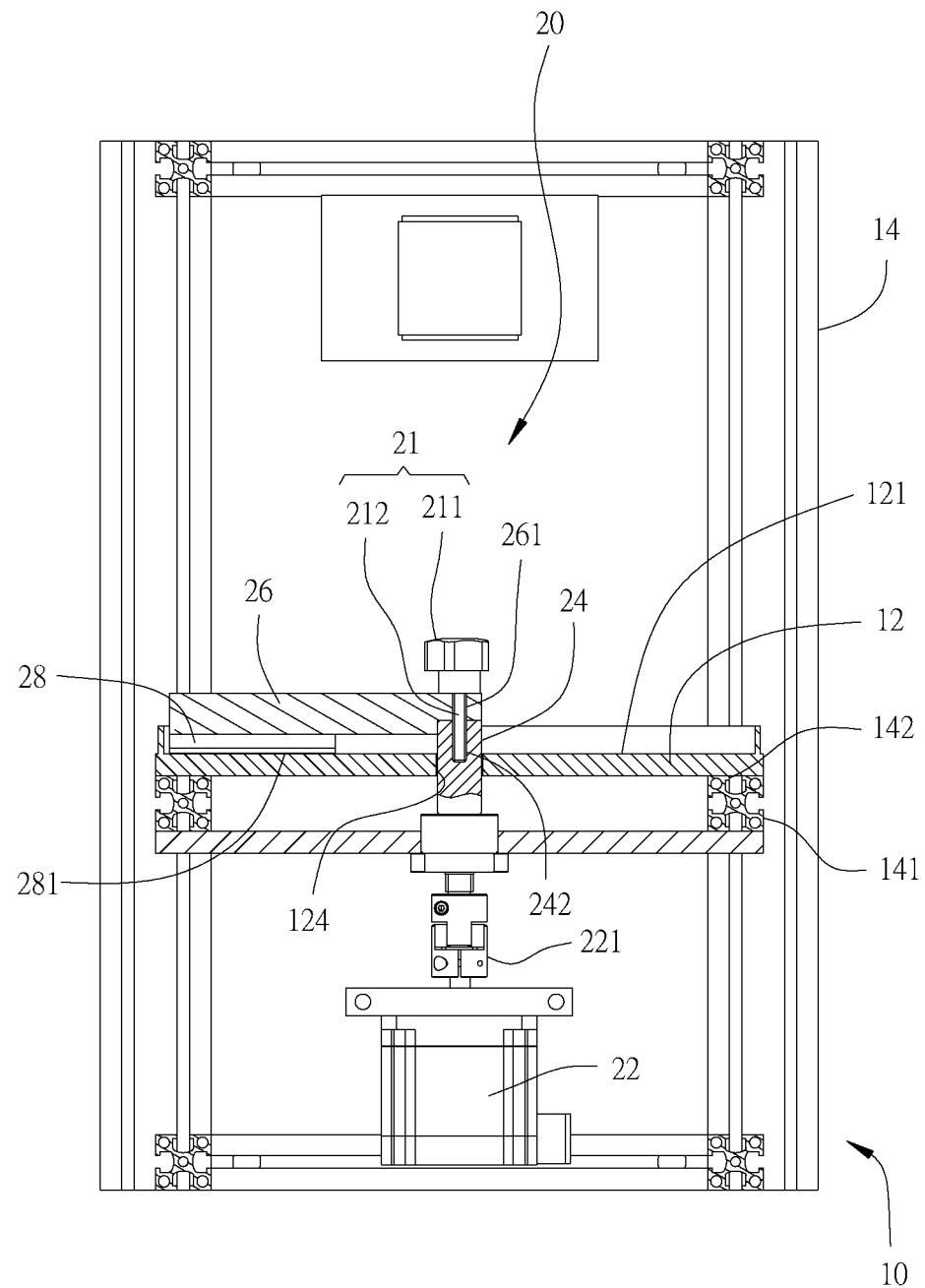
FIG. 5 is a sectional view taken along the 5-5 line in FIG. 4.
Figure 6:
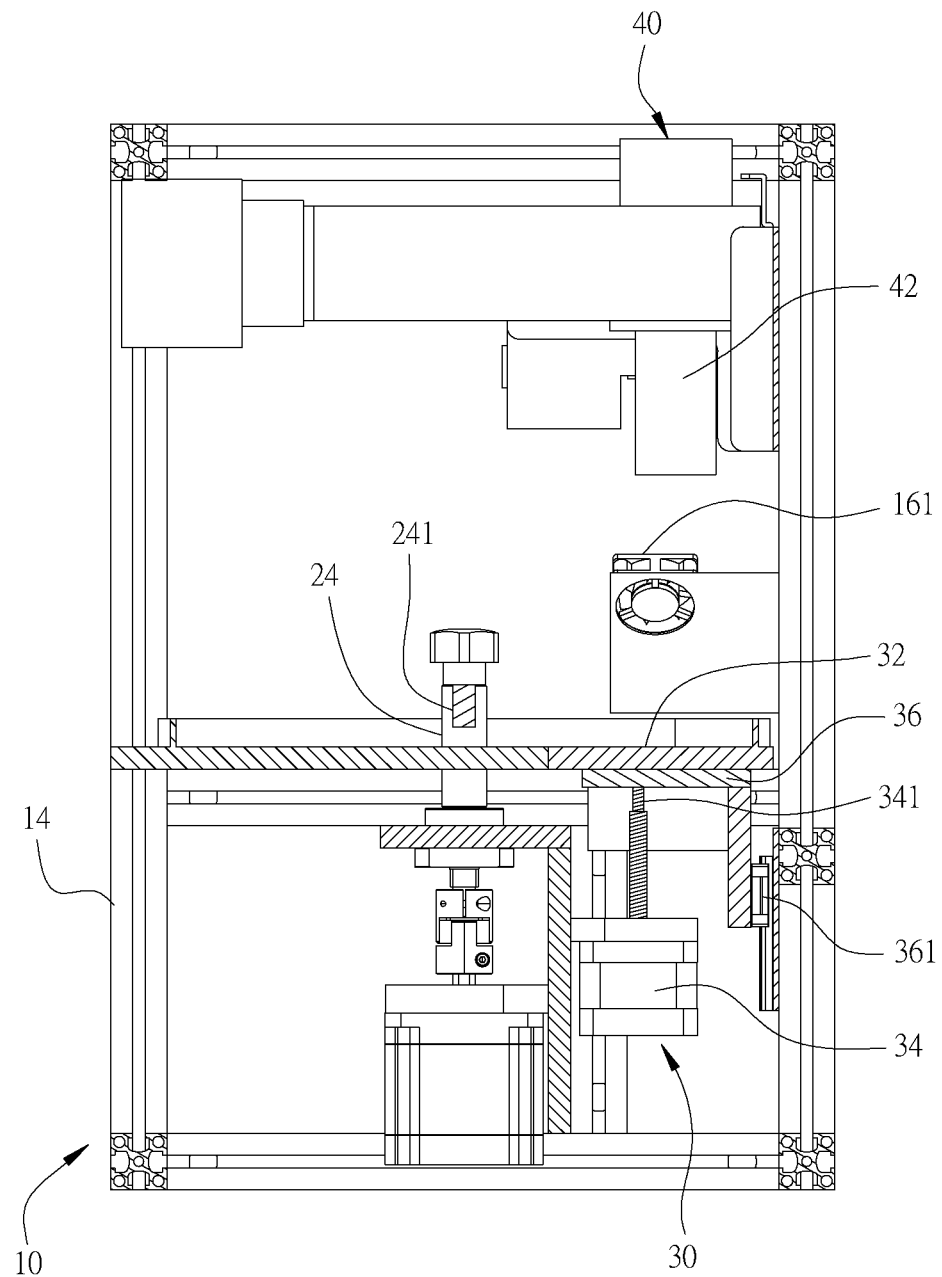
FIG. 6 is a sectional view taken along the 6-6 line in FIG. 4.

As illustrated in FIG. 1 to FIG. 6, a stereolithographic apparatus 100 includes a machine body 10 and a slurry material feeding device 50, wherein a recoating device 20 a lifting apparatus 30, and a light-emitting device 40 are disposed in the machine body 10. The slurry material feeding device 50 is adapted to supply a slurry material to the machine body 10. The slurry material supplied to the machine 10 is spread evenly to form a build layer, and the build layer is partially cured (namely sintered) by exposing the build layer to a light to form a build layer. The stereolithographic apparatus 100 repeats a process of spreading and curing the slurry material to build a printed product, such as a ceramic green body printed by using a ceramic slurry material, layer by layer.

The machine body 10 has a swept platform 12, wherein a top surface of the swept platform 12 has a swept surface 121. A recess 122 is formed by recessing into a circumference of the swept platform 12 and has an opening 123 on the circumference of the swept platform 12. In the current embodiment, the recess 122 is trapezoidal, wherein a width of the recess 122 is reduced in a direction from the circumference of the swept platform 12 to a center of the swept platform 12. In other embodiments, the recess 122 could be triangular. Alternatively, an edge of the recess 122 could be curved.

The recoating device 20 has a motor 22, wherein the motor 22 is disposed in the machine body 10. The motor 22 is connected to a shaft 24 via a coupling 221. The shaft 24 is engaged with a blade holder 26, wherein the recoating blade 28 is disposed on the blade holder 26 and is located at a radial side of the shaft 24. The recoating blade 28 could be made of a soft material or a hard material and has a cutting edge 281 that is adjacent to or abuts against the swept surface 121. As illustrated in FIG. 5 and FIG. 7 to FIG. 8A, when the recoating blade 28 is rotated, the cutting edge 281 sweeps the swept surface 121, wherein an area that is swept by the cutting edge 281 is defined to be a swept area A, and at least a portion of the recess 122 is located in the swept area A. In other embodiments, the recess 122 is completely located in the swept area A.

The lifting apparatus 30 has a build platform 32, wherein the build platform 32 has a first portion and a second portion. The first portion of the build platform 32 abuts against the swept platform 12 and is located in the recess 122. An edge of the first portion of the build platform 32 is aligned with the edge of the recess 122. The second portion of the build platform 32 is not applied any slurry material, so that the second portion of the build platform 32 could be grabbed by a machine or a user to move the build platform 32. The build platform 32 is driven by a linear actuator 34 to move up and down along a linear direction. In the current embodiment, the linear direction is parallel to an axial direction of the shaft 24. The linear actuator 34 is disposed in the machine body 10. When the build platform 32 is located at an initial position, a top surface of the build platform 32 is aligned with the swept surface 121. The build platform 32 is controllable to be moved downward to a bottom position by the linear actuator 34.

The light-emitting device 40 has a lens 42, wherein the lens 42 emits a light in a direction toward the build platform 32 (i.e. the lens 42 faces in a direction toward the build platform 32). The light-emitting device 40 could be a DLP (Digital Light Processing) projector, an LCD (liquid crystal display) projector, or a laser scanner. The resolution of the light-emitting device 40 is high enough to print the ceramic green body that meets a precision requirement. For example, the resolution of the light-emitting device 40 could be full High Definition (FHD), 4K, or even 8K. The light resource of the light-emitting device 40 could be ultraviolet (UV), ultraviolet A (UVA), or visible light. The light-emitting device 40 projects a light pattern that corresponds to a structural pattern of each layer of the printed product on the build platform 32 via a normal projection or a scanning projection.

Figure 8A:
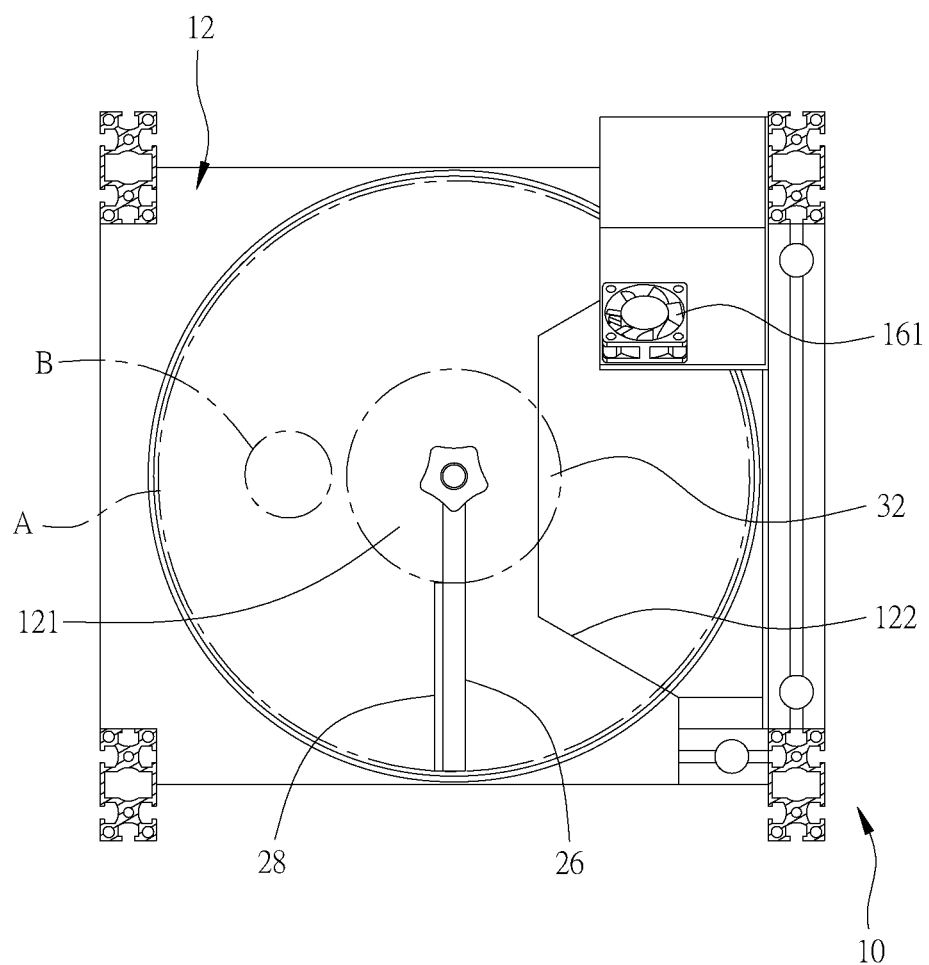
FIG. 8A is a sectional view taken along the 8A-8A line in FIG. 7.
Figure 8B:
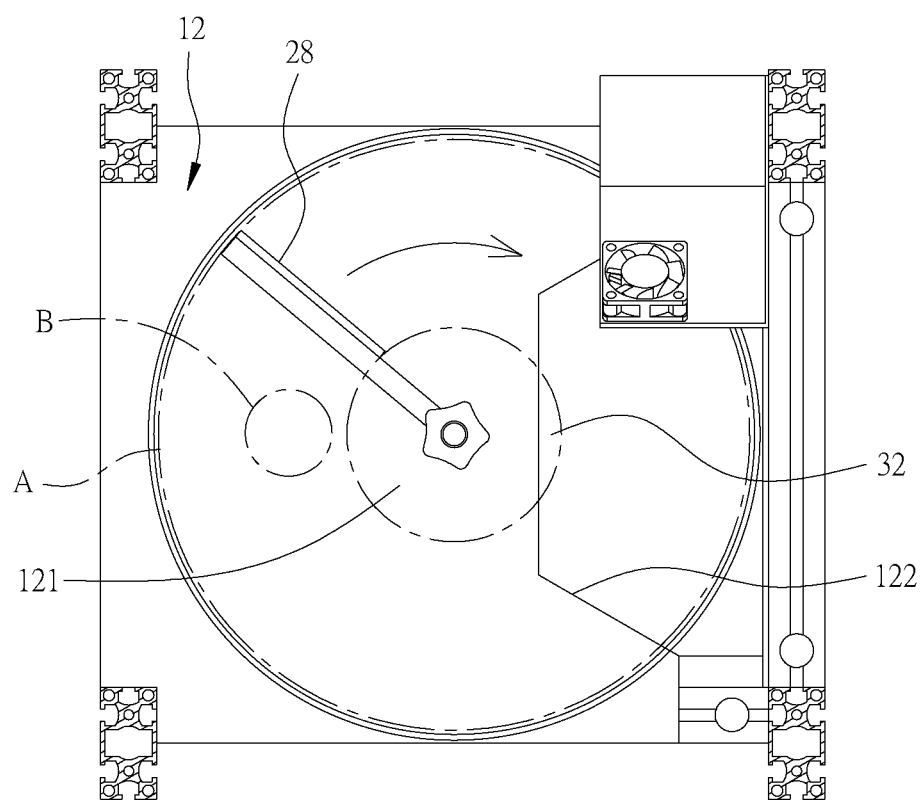
FIG. 8B and FIG. 8C are similar to FIG. 8A, showing the operation of the recoating blade.

As illustrated in FIG. 1 and FIG. 8A, the slurry material feeding device 50 has an outlet 52, wherein the outlet 52 supplies the slurry material onto the swept area A (i.e. the outlet 52 faces toward the swept area A). An area of the swept surface 121 that is right below the outlet 52 is defined to be a material feeding area B, so that the slurry material outputted from the outlet 52 is loaded to the material feeding area B. The slurry material for stereolithography usually includes a powder, a binder, and a solvent. The powder could be polymer powder, ceramic powder, metallic powder, and other composite material powder, wherein individual particles of the powder could be in a nanometer scale or micrometer scale. The binder is a light-curing resin. The solvent is adapted to dilute the binder and is usually a hydroxyl functional solvent to reduce a viscosity of the slurry material and facilitate the slurry material to be dried due to the volatilization of hydroxyl functional solvent. In an embodiment, the solvent of the binder could be water. In an embodiment, when the slurry material includes the solvent, the viscosity of the slurry material could be increased faster by heating the slurry material, thereby increasing a solid content and a support strength of the slurry that is spread on the build platform. In another embodiment, when the slurry material does not include a solvent, the viscosity of the slurry material could be reduced by heating the slurry material, and the solid content of the slurry that is spread on the build platform remains the same. In an embodiment, the viscosity of the slurry material could be increased not only by using a volatile solvent as a solvent of the binder, but also by heating the slurry material, thereby increasing a support strength of the slurry that is spread on the build platform. When a difference between a viscosity of the build layer formed by sweeping and the viscosity of the slurry material provided by the material feeding device 50 is small, a rotational speed of the recoating blade 28 of the recoating device 20 should be reduced to prevent the effect due to the shearing force to spreading layer process.

When a difference between a viscosity of the build layer formed by sweeping and the viscosity of the slurry material provided from the slurry material feeding device 50 is great, the build layer is hard to be affected by a shearing force during spreading the slurry material. In order to increase the viscosity difference between the build layer and the slurry material, the outlet 52, the swept surface 121, and the build platform 32 could be disposed with temperature controllers, respectively. In the embodiment, when the slurry material does not include a solvent, a temperature of the outlet 52 and a temperature of the swept surface 121 could be increased to reduce the viscosity of the slurry material, and a temperature of the build platform 32 could be reduced to increase the viscosity of the build layer.

In the current embodiment, the recess 122 is located at a side of the swept area A that is opposite to another side of the swept area A where the material feeding area B is located. More specifically, the recess 122 is located opposite to the material feeding area B relatively to the shaft 24. Before the recoating blade 28 starts to rotate, an initial position of the recoating blade 28 is located between the material feeding area B and the build platform 32. When the recoating blade 28 is driven by the motor 22 to start rotating, the recoating blade 28 is rotated in a rotating direction toward the material feeding area B. In a rotating process, the recoating blade 28 is constantly rotated in the same rotating direction, and each turn of the rotation of the recoating blade 28 is defined to be a printing cycle, wherein each of the build layers is printed in one of the printing cycles.

Figure 7:
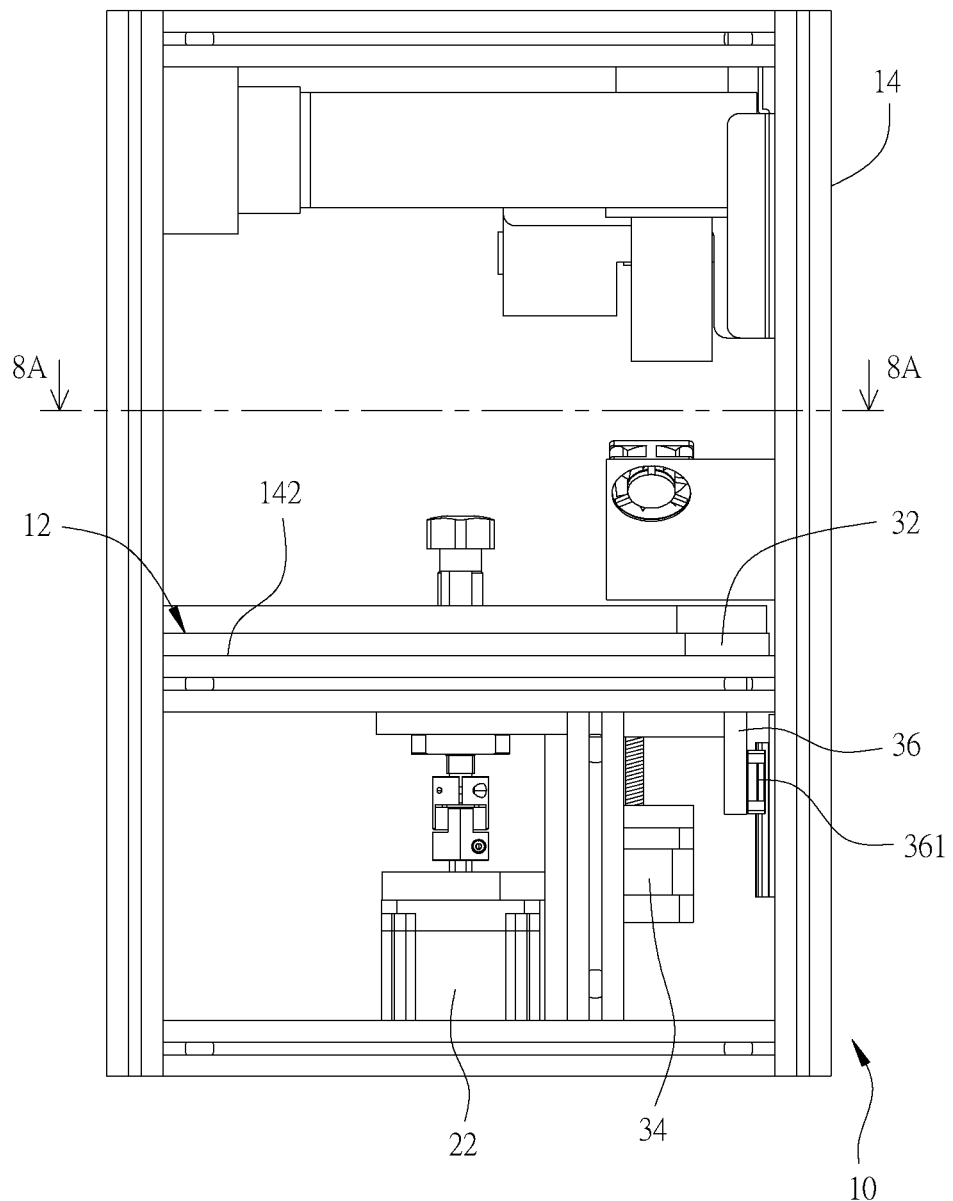
FIG. 7 is a front view of the machine body of the stereolithographic apparatus shown in FIG. 1.
Figure 8C:
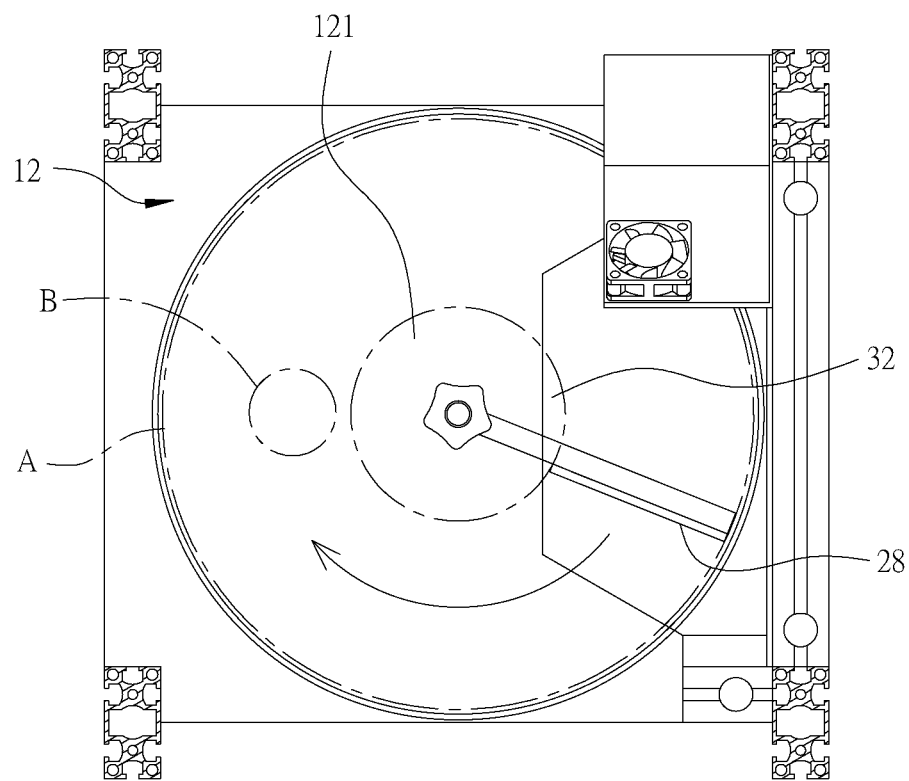

As illustrated in FIG. 1, FIG. 7, and FIG. 8C, when the stereolithographic apparatus 100 is operated, the motor 22 drives the recoating blade 28 to constantly rotate in the rotating direction from the initial position. Every time the recoating blade 28 is rotated one turn (namely after every printing cycle), the slurry material feeding device 50 provides the slurry material through the outlet 52 to the material feeding area B. Then, the recoating blade 28 sweeps through the material feeding area B in a rotating motion to spread the slurry material, which is supplied to the material feeding area B and remains on the swept surface 121, on the swept surface 121 and a top surface of the build platform 32 in the swept area A, wherein the slurry material that is located on the top surface of the build platform 32 forms a build layer.

In each of the printing cycles, after the recoating blade 28 spreads the slurry material to form a build layer, the build platform 32 is descended a distance that is equal to a thickness of the build layer. Then, the light-emitting device 40 projects a light pattern corresponding to the structural pattern of each layer of the printed product to the build layer to partially cure the build layer to form the build layer. When the stereolithographic apparatus 100 is operated, the aforementioned processes, including supplying the slurry material by the slurry material feeding device 50, spreading the slurry material by the recoating blade 28, descending the build platform 32, and irradiating the build layer by the light-emitting device 40 are repeatedly conducted. After several printing cycles, the build platform 32 is gradually descended to the bottom position, and a delicate printed product is formed by piling the build layers on the build platform 32. After the printed product, such as a ceramic green body, is washed, the ceramic green body could be put in a sintering furnace to be sintered to form a final ceramic product.

Figure 11:
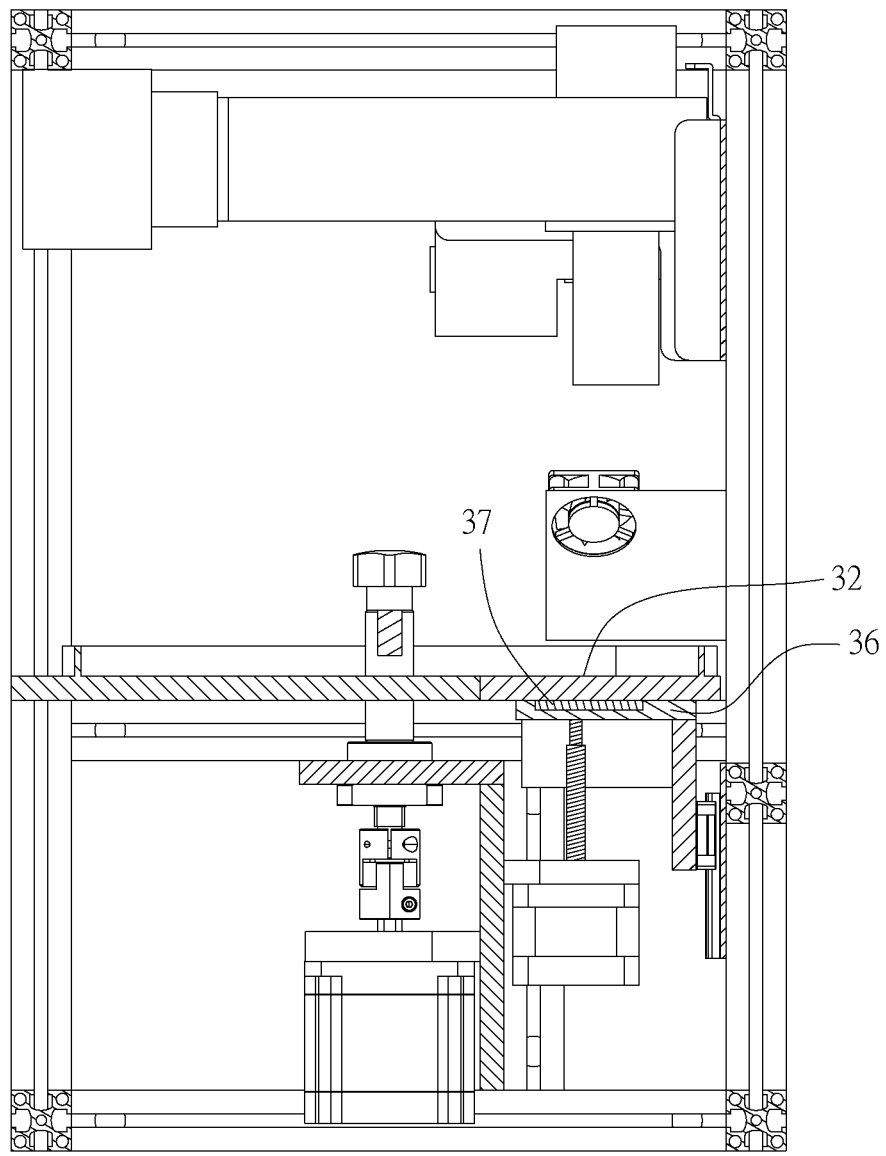
FIG. 11 is similar to FIG. 10, showing the stereolithographic apparatus of another embodiment.

More specifically, as illustrated in FIG. 1 to FIG. 6, the machine body 10 has a frame 14, wherein the frame 14 is a hollowed frame structure, which forms at least one hollowed portion. The frame 14 of the machine body 10 is disposed with a fan frame 16, wherein a fan 161 is mounted on the fan frame 16 and continuously creates wind in a direction toward the top surface of the build platform 32 (i.e. an air outlet of the fan 161 faces in a direction toward the build platform 32). With such design, the slurry material just outputted from the slurry material feeding device 50 could have lower viscosity, and after the slurry material is spread on the build platform 32 by the recoating blade 28, the solvent of the slurry material will be dried due to the wind from the fan 161, thereby generating the build layer that has a higher viscosity and is suitable to be irradiated by the light-emitting device 40 to form build layer. As illustrated in FIG. 11, a stereolithographic apparatus of another embodiment is equipped with a heating device 37, wherein the build platform 32 is a metal platform, such as a platform made of aluminum, and a bottom side of the build platform 32 is disposed with and in contact with the heating device 37. The heating device 37 could heat the build platform 32 to volatilize the solvent in the build layer, so that the build layer could be dried, which means a viscosity of the build layer could be increased, to make the build layer suitable for irradiating by the light-emitting device 40. Except for the heating device, a structure of the stereolithographic apparatus of another embodiment is almost the same as the aforementioned embodiment. By adding the fan 161 and/or the heating device 37, the viscosity of the slurry material provided by the slurry material feeding device 50 could be reduced, because the fan 161 and the heating device 37 could dry the slurry when the recoating blade 28 spreads the slurry material having asmaller viscosity on the build platform 32. After the viscosity of the build layer is reduced, a displacement of the build layer caused by the shearing force could be reduced, thereby keeping a size of a workpiece (the printed product) correctly. Besides, after the solvent is volatilized due to the wind from the fan 161 and/or the heat from the heating device 37, a volume of the build layer is reduced, thereby increasing a solid content of the powder in the build layer. Thus, the printed product could be a ceramic green body has a high solid content. After the ceramic green body that is printed is sintered, the finalized workpiece having high density and high strength could be obtained.

Figure 9:
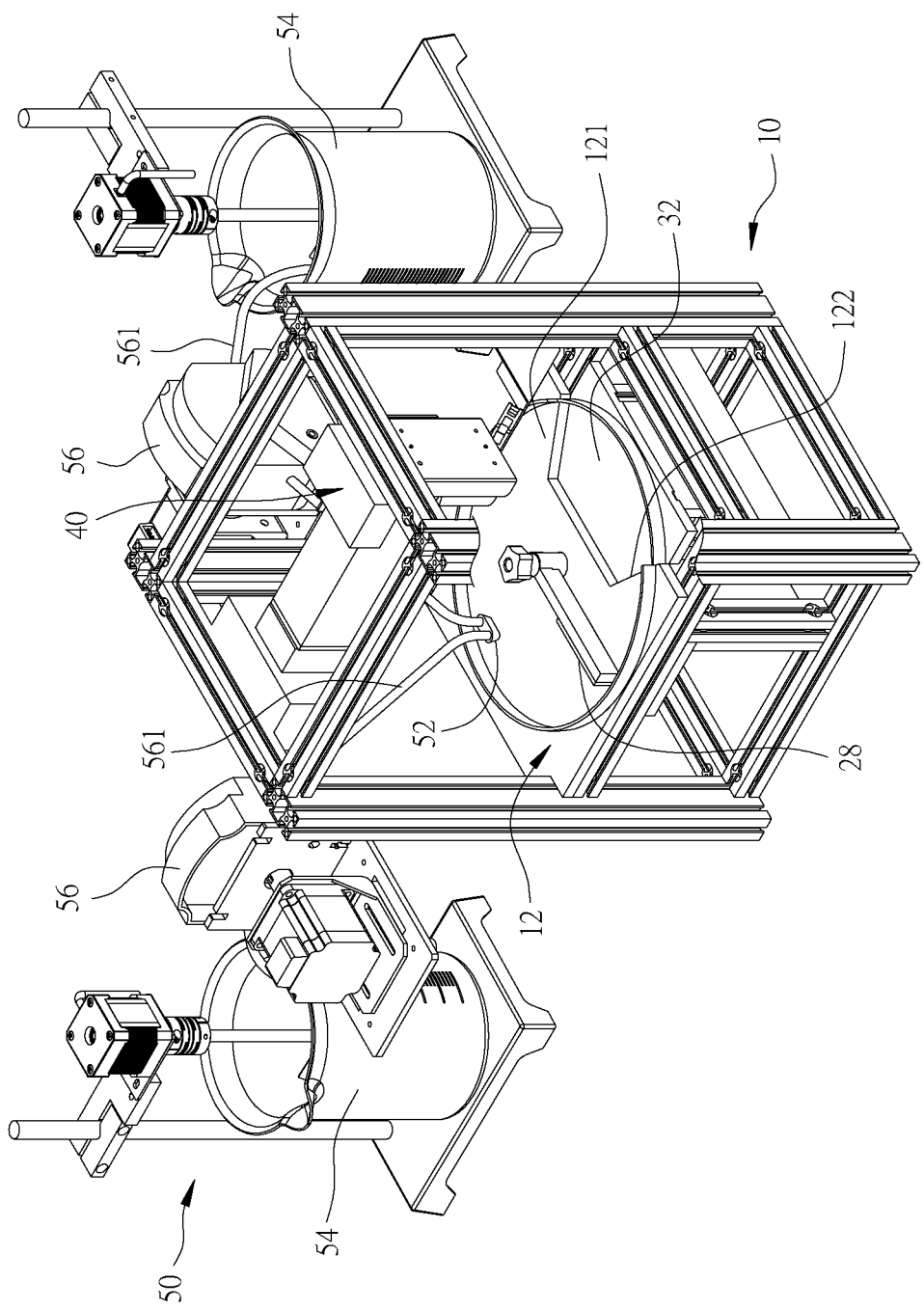
FIG. 9 is a perspective view of the stereolithographic apparatus, showing the build platform is moved downward.
Figure 10:
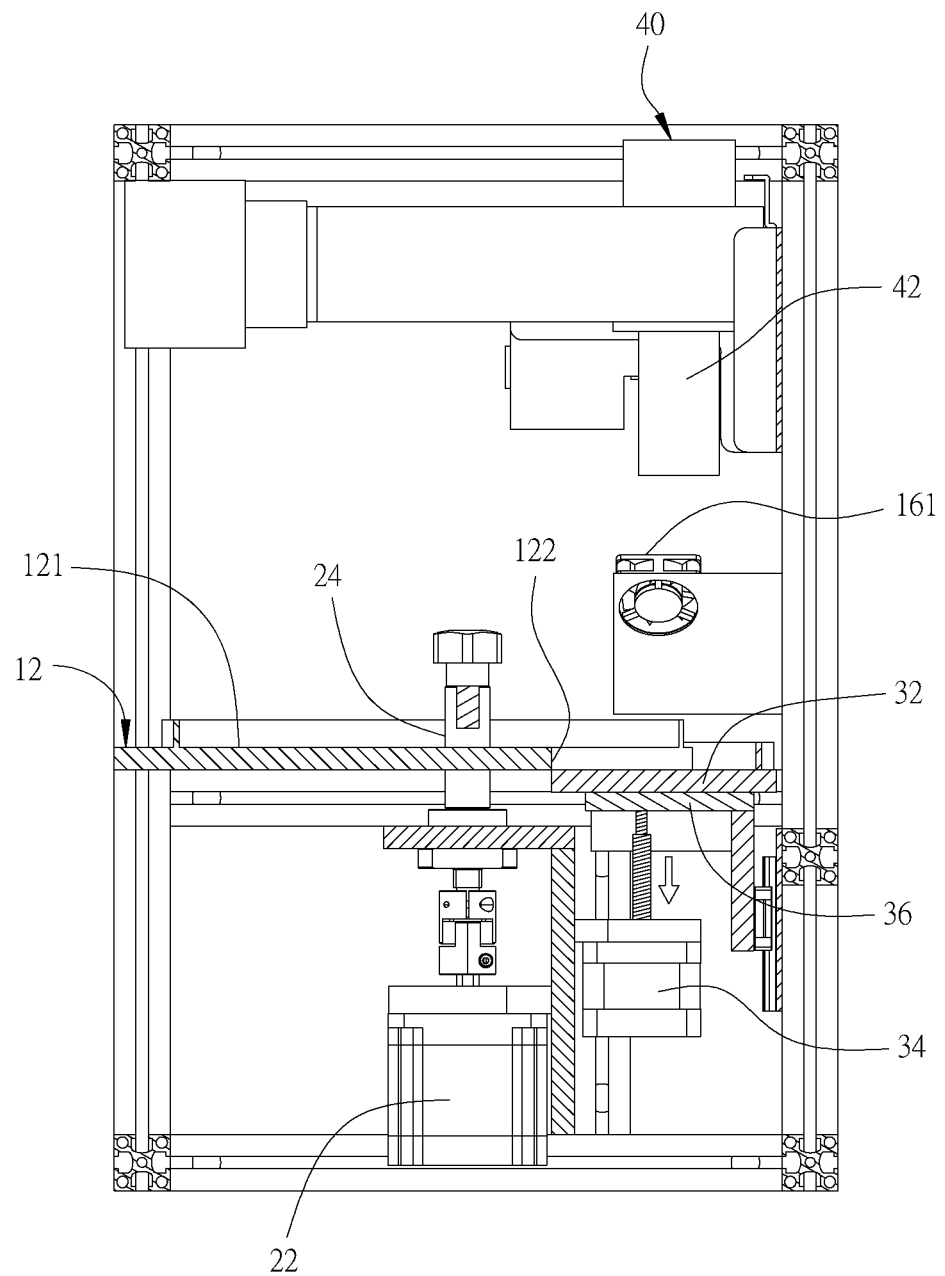
FIG. 10 is similar to FIG. 6, showing the build platform is moved downward.

In the current embodiment, the linear actuator 34 is an electronic actuator rod, wherein a top end of the linear actuator 34 is a transmitting end 341, and the transmitting end 341 is engaged with a supporting platform 36 for supporting the build platform 32. A linear sliding track 361 is engaged between the supporting platform 36 and the frame 14 of the machine body and is adapted to guide the supporting platform 36 to stably lift or descend when the supporting platform 36 is driven by the linear actuator 34, as illustrated in FIG. 9 and FIG. 10. A top surface of the supporting platform 36 is disposed with a track 362. A bottom portion of the build platform 32 has a groove 321 that corresponds to the track 362 on the supporting platform 36. The build platform 32 could be moved from the opening 123 to the recess 122 of the swept platform 12. During a process of moving the build platform 32 to the recess 122 of the swept platform 12 through the opening 123 of the swept platform 12, the groove 321 of the build platform 32 is moved along the track 362 of the supporting platform 36, thereby allowing the build platform 32 to be detachably disposed on the supporting platform 36. As illustrated in FIG. 11, the heating device is located at a top portion of the supporting platform 36, wherein the heating device 37 could be in touch with the build platform 32 of the supporting platform 36 and is adapted to heat the build platform 32 up.

Two opposite beams 141 of the frame 14 of the machine body 10 form a bracket 142 for supporting the swept platform 12, wherein the swept platform 12 is detachably disposed on the bracket 142. The swept platform 12 has a perforation 124 for passing the shaft 24 at a position corresponding to a center of the swept area A. The motor 22 of the recoating device 20 is located below the swept platform 12, and the shaft 24 connected to the motor 22 pivotally passes through the perforation 124 of the swept platform 12. A top end surface of the shaft 24 has a slot 241, wherein the slot 241 passes an axis of the shaft 24 and two opposite sides of a circumference of the shaft 24. A bottom surface of the slot 241 has a threaded hole 242. The blade holder 26 has a proximal end portion and a distal end portion, wherein the proximal end portion of the blade holder 26 has a perforation 261 and is inserted into the slot 241. The perforation 261 of the blade holder 26 is passed by a fastener 21, wherein the fastener 21 has a head portion 211 and a screw rod 212 that is connected to the head portion 211. The head portion 211 is a knob providing for rotating. The screw rod 212 passes through the perforation 261 of the blade holder 26 and screws into the threaded hole 242 of the shaft 24, thereby fixing the proximal end portion of the blade holder 26 to the shaft 24. In the current embodiment, the recoating blade 28 is located at the distal end of the blade holder 26.

During a recoating process executed by the recoating blade 28, in order to avoid the slurry material being splashed out of the swept platform 12 to pollute the environment or to increase the difficulty of recycling the slurry material that is remained on the swept platform 12. The swept platform 12 is disposed with a first wall 18 at a portion out of the swept area A. In the current embodiment, the first wall 18 is an isolating plate having a gap (namely a C-shaped plate). Each of two ends of the first wall 18 extends to one of opposite sides of the opening 123. On the top surface of the build platform 32 is disposed with a second wall 38 at a portion out of the swept area A. The second wall 38 is an isolating plate that correspondingly fits the gap of the first wall 18. Each of the two ends of the first wall 18 abuts against one of two ends of the second wall 38 to form a circular wall and to encircle a circumference of the swept area A, thereby avoiding the slurry material to be splashed out of the swept platform 12 and the build platform 32. In other embodiments, the first wall 18 and the second wall 38 could form a square-shaped wall, a polygon-shaped wall, or a wall in any other shape.

When the recoating blade 28 needs to be cleaned, the fastener 21 could be detached by rotating for allowing the blade holder 26 and the recoating blade 28 to be taken off from the shaft 24, and then the recoating blade 28 could be taken off to clean. When the slurry material remaining on the swept platform 12 needs to be recycled and the swept platform 12 needs to be cleaned, the swept platform 12 is lifted from the bracket 142 after the blade holder 26 and the recoating blade 28 is taken off from the shaft 24, and then the swept platform 12 is slightly tilted to move the swept platform 12 out of the frame 14 through the hollowed portion of the frame 14. Thus, the slurry material remaining on the swept platform 12 could be recycled and the swept platform 12 could be washed and cleaned. Since the first wall 18 and the second wall 38 prevent the slurry material from splashing out, so that most of the slurry material remains on the swept platform 12. When the swept platform 12 is cleaned, the powder in the slurry material remaining on the swept platform 12 could be collected and used for printing a following product, thereby avoiding the waste of material and reducing the manufacturing cost.

The slurry material feeding device 50 could have one or more stirred tank(s) 54. In the current embodiment, the slurry material feeding device 50 has two stirred tanks 54, wherein each of the two stirred tanks 54 is disposed with a peristaltic pump 56. Each of the peristaltic pumps 56 is passed through by a silicone tube 561. An end of each of the silicone tubes 561 extends into one of the stirred tanks 54, and the other end of each of the silicone tubes 561 is connected to the outlet 52. Since the slurry material feeding device 50 has two stirred tanks 54, the slurry material feeding device 50 could mix ingredients in each of the two stirred tanks 54 to obtain the slurry material for outputting through the outlet 52. In other embodiments, when the slurry material feeding device 50 is merely disposed with one stirred tank 54, an end of the silicone tube 561 that does not extend into the stirred tank 54 is the outlet 52, and the slurry material in the stirred tank 54 is outputted through the outlet 52.

At every printing cycle, the build platform 32 is descended the distance that is approximately equal to the thickness of the build layer. However, when the build platform 32 is descended, the material layer on the build platform 32 will be drawn by the slurry material on an edge of the swept surface 121 of the swept platform 12. In order to prevent thebuild layer on the build platform 32 from adhering to the slurry material on the swept platform 12 (namely, the build layer on the build platform 32 and the slurry material on the swept platform 12 could not be separated), a method of descending the build platform 32 is provided as below. The linear actuator 34 drives the build platform 32 to descend a first distance that is greater than a thickness of the build layer to assure that the build layer on the build platform 32 is cut off from the slurry material on an edge of the swept surface 121, and then the build platform 32 is lifted a second distance to allow the build platform 32 to be descended the distance that is approximately equal to the thickness of the build layer in each of the printing cycles.

The stereolithographic apparatus 100 of the present invention is adapted to manufacture the printed product layer by layer as described above. Besides, since the build platform 32 could be moved to the recess 122 of the swept platform 12 from the opening 123 of the swept platform 12, the stereolithographic apparatus 100 could be combined with automatic equipment to manufacture the printed product continuously. At the beginning of the continuous manufacture, the automatic equipment (not shown) puts a build platform 32 onto the supporting platform 36 for supporting the build platform 32, and then the fan 161 is activated to create wind in the direction toward a top surface of the build platform 32. In a process of spreading the slurry material in every printing cycle, the recoating blade 28 is rotated to spread the slurry material to the top surface of the build platform 32. After the slurry material is spread on the build platform 32 by the recoating blade 28, the build platform 32 is descended a distance that is equal to the thickness of the build layer, and then the light-emitting device 40 projects a light pattern of each layer of the printed product on the build platform 32 to partially cure the build layer to form the build layer.

When the linear actuator 34 drives the supporting platform 36 and the build platform 32 to move down to the bottom position layer by layer. Simultaneously, the printed product on the build platform 32 is printed completely. The automatic equipment could take off the build platform 32 along with the printed product, such as the ceramic green body, on the build platform 32. Next, the ceramic green body is transmitted to the cleaning apparatus to wash, and then the ceramic green body is sintered to form ceramic. After the build platform 32 along with the printed product is taken off by the automatic equipment, the linear actuator 34 drives the supporting platform 36 to move upward to the initial position, so that the automatic equipment could put another build platform 32 on the supporting platform 36 to begin another printing process, thereby achieving continuous manufacture of the 3-dimension printed product or the ceramic green body. The manufacture will not be disrupted after the product is printed completely.

The time of the slurry material feeding device 50 squeezing the slurry material onto the swept surface 121 of the swept platform 12, the time of the linear actuator 34 driving the build platform 32 to descend successively, and the time of light-emitting device 40 irradiating the build layer are overlapped with the time of the recoating blade 28 is driven to rotate and to spread the slurry material on the swept surface 121 and the build platform 32, wherein the time of every printing cycle is equal to the time of recoating blade 28 rotating one turn. As a result, the operation of the slurry material feeding device 50, the operation of the linear actuator 34, the operation of the light-emitting device 40, and the operation of the recoating blade 28 could perform simultaneously without delaying each other, thereby saving the manufacturing time.

It must be pointed out that the embodiment described above is only a preferred embodiment of the present invention. All equivalent structures which employ the concepts disclosed in this specification and the appended claims should fall within the scope of the present invention.

What is claimed is:

1. A stereolithographic apparatus, comprising:
   a machine body having a swept platform, wherein a top surface of the swept platform has a swept surface and a recess that is formed by recessing into a circumference of the swept platform; the recess has an opening on the circumference of the swept platform;
   a recoating device having a motor that is disposed in the machine body, wherein the motor is connected to a shaft, and the shaft is engaged with a blade holder; a recoating blade is disposed on the blade holder and has a cutting edge that is adjacent to or abuts against the swept surface; an area that is swept by the cutting edge is defined to be a swept area, wherein at least a portion of the recess is located in the swept area;
   a lifting apparatus having a build platform that is located in the recess, wherein an edge of a portion of the build platform is aligned with and abuts against an edge of the recess; the build platform is driven by a linear actuator to move linearly, and the linear actuator is disposed in the machine body;
   a light-emitting device disposed in the machine body and having a lens, wherein the lens faces in a direction toward the build platform; and
   a slurry material feeding device having an outlet, wherein the outlet faces toward the swept area;
   wherein an area of the swept surface that is right below the outlet is defined to be a material feeding area;
   wherein a top surface of the build platform is located within the swept area; and
   wherein every time the recoating blade rotates one turn, the recoating blade sequentially sweeps through the material feeding area and the top surface of the build platform.

2. The stereolithographic apparatus as claimed in claim 1, wherein a top end surface of the shaft has a slot, and the slot passes an axis of the shaft and has a threaded hole at a bottom surface of the slot; the blade holder has a proximal end portion and a distal end portion, wherein the proximal end portion of the blade holder has a perforation and is inserted into the slot, and the perforation of the blade holder is passed by a fastener; the fastener has a head portion and a screw rod that is connected to the head portion; the screw rod passes through the perforation of the blade holder and screws into the threaded hole of the shaft.

3. The stereolithographic apparatus as claimed in claim 2, wherein the machine body has a frame, and the frame has a bracket for supporting the swept platform; the swept platform is detachably disposed on the bracket.

4. The stereolithographic apparatus as claimed in claim 3, wherein the swept platform has a perforation for passing the shaft at a position corresponding to a center of the swept area; the motor of the recoating device is located below the swept platform, and the shaft connected to the motor pivotally passes through the perforation of the swept platform.

5. The stereolithographic apparatus as claimed in claim 1, wherein the build platform is movable into or out of the recess through the opening; the linear actuator has a transmitting end, and the transmitting end is engaged with a supporting platform for supporting the build platform; the build platform is detachably disposed on the supporting platform.

6. The stereolithographic apparatus as claimed in claim 5, wherein a linear sliding track is engaged between the supporting platform and the machine body.

7. The stereolithographic apparatus as claimed in claim 1, wherein the machine body is disposed with a fan frame, and the fan is mounted on the fan frame; the fan faces in a direction toward the build platform.

8. The stereolithographic apparatus as claimed in claim 1, wherein the swept surface is disposed with a first wall at a portion out of the swept area, and the top surface of the build platform is disposed with a second wall at a portion out of the swept area; each of two ends of the first wall abuts against one of two ends of the second wall to form a circular wall that encircles the swept area.

9. The stereolithographic apparatus as claimed in claim 1, wherein the slurry material feeding device has a stirred tank, and the stirred tank is disposed with a peristaltic pump; the peristaltic pump is passed through by a silicone tube; an end of the silicone tube extends into the stirred tank, and the other end of the silicone tube forms the outlet.

10. The stereolithographic apparatus as claimed in claim 1, wherein the slurry material feeding device has a plurality of stirred tanks, and each of the plurality of stirred tanks is disposed with one of a plurality of peristaltic pumps; each of the plurality of peristaltic pumps is passed through by one of a plurality of silicone tubes; an end of each of the plurality of silicone tubes extends into corresponding one of the plurality of stirred tanks, and the other end of each of the plurality of silicone tubes is connected to the outlet.

11. The stereolithographic apparatus as claimed in claim 1, a bottom side of the build platform is disposed with a heating device that is in contact with the build platform.

* * * * *